United States Patent [19]

Barzegar et al.

[11] Patent Number: 5,559,501

[45] Date of Patent: Sep. 24, 1996

[54] PLUG-IN WIRELESS MODULE FOR OPERATION WITH PORTABLE WIRELESS ENABLED HOST EQUIPMENT

[75] Inventors: Farhad Barzegar, Township of Hillsborough, Somerset County; Peter B. Guerlain, Boonton, both of N.J.

[73] Assignee: Lucent Technologies Inc., Murray Hill, N.J.

[21] Appl. No.: 289,739

[22] Filed: Aug. 12, 1994

[51] Int. Cl.⁶ .................................................. H04B 1/06
[52] U.S. Cl. ............... 340/825; 340/825.44; 364/705.01; 455/344; 455/346
[58] Field of Search ............................. 340/825, 825.44; 364/705.01, 705.05; 379/58, 61; 455/343, 344, 346, 66

[56] References Cited

U.S. PATENT DOCUMENTS

| | | | |
|---|---|---|---|
| 4,806,906 | 2/1989 | Oda et al. | 340/825.44 |
| 4,807,292 | 2/1989 | Sorscher | 455/346 |
| 5,043,721 | 8/1991 | May | 364/705.05 |
| 5,121,504 | 6/1992 | Toko | 455/346 |
| 5,241,542 | 8/1993 | Natarajan et al. | 455/343 |
| 5,418,524 | 5/1995 | Fennell | 364/705.05 |

FOREIGN PATENT DOCUMENTS 0164716  12/1986  Japan ..................................... 455/346

OTHER PUBLICATIONS

PCMCIA–Sized Radio Links Portable WLAN Terminals, "Electronic Design", Leonard, M., Aug. 5, 1993, pp. 45–50.

*Primary Examiner*—Michael Horabik
*Assistant Examiner*—Edward Merz
*Attorney, Agent, or Firm*—Alfred G. Steinmetz

[57] ABSTRACT

A wireless-enabled host electronic equipment includes a built-in antenna and special plug-in receptacles enabling a plug-in wireless communicator to interact with the host and to connect to the built-in antenna for wireless transmission and reception. In accord with the invention the plug-in arrangement is constructed to conform to a standardized plug-in arrangement, such as a PCMCIA standard and to provide additional plug-in capability in addition to the standardized receptacle which does not conflict with the standardized receptacle. The plug-in arrangement is configured to permit use of a plug-in for other purposes in the same standard receptacle.

9 Claims, 4 Drawing Sheets

FIG. 16
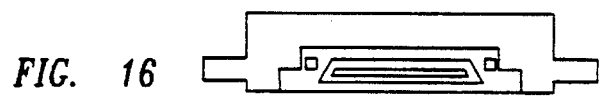
FIG. 10
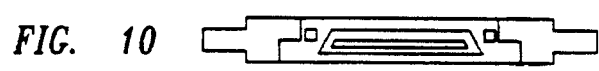
FIG. 14    FIG. 6    FIG. 15
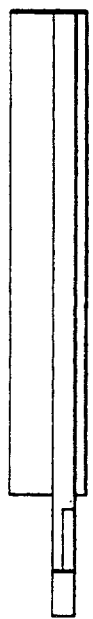  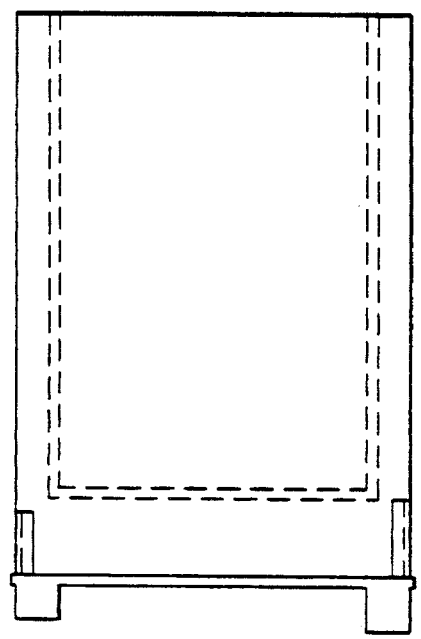 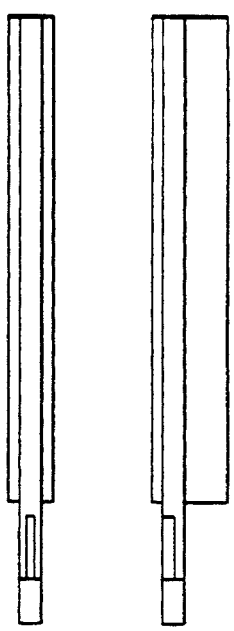
FIG. 8    FIG. 9
FIG. 7
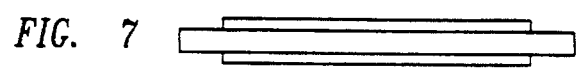
FIG. 13

5,559,501

PLUG-IN WIRELESS MODULE FOR OPERATION WITH PORTABLE WIRELESS ENABLED HOST EQUIPMENT

FIELD OF THE INVENTION

This invention relates to enabling wireless communication to electronic host equipment by means of a plug-in wireless processing module and in particular to the RF connectors of such a plug-in unit permitting multiple uses of the plug-in receptacles for purposes other than wireless enablement and to an antenna arrangement included in the host equipment and operating in combination with the plug-in wireless processing module.

BACKGROUND OF THE INVENTION

Wireless communication for electronic equipment is often desirable for permitting uploading and downloading of data and for other purposes requiring communication with some distant source in the absence of wired communications. Embedding the wireless communication equipment within tile electronic module is limiting in that standards of wireless communication may change or it may be desirable to allow communication in more than one system of wireless communication (i.e. cellular voice communication; wireless local area networks, etc.). This may be alleviated in part by use of plug-in wireless signaling units. However this may be unsatisfactory because the unit adds undesirable bulk or must be located in a disadvantageous position for its intended purpose.

In the instance of portable electronic equipment such as a notebook computer or a portable digital assistant (PDA) the ability to adapt to different and new wireless communication systems is essential to efficient use. The use of an auxiliary wireless communication unit may need to be positioned in a configuration that exposes it to noise or which is located such as to be subject to damage.

SUMMARY OF THE INVENTION

Therefore a wireless-enabled host electronic equipment, according to the principles of the invention, includes built-in antennas and special plug-in receptacles enabling a plug-in wireless communicator to interact with the host and to connect to the built-in antenna for wireless transmission and reception. In accord with the invention the plug-in arrangement is constructed to conform to a standardized plug-in arrangement, such as a PCMCIA (i.e, Personal Computer Memory Card Industry Association) standard and to provide additional plug-in capability in addition to the standardized receptacle which does not conflict with the standardized receptacle. The plug-in arrangement is configured to permit use of a plug-in for other purposes in the same standard receptacle.

BRIEF DESCRIPTION OF THE DRAWING

FIG. 6 is a plan view of the plug-in wireless processor module;

FIGS. 7, 8, 9, and 10 are differing orthogonal side and end views of one version of the module shown in the FIG. 6;

FIGS. 13, 14, 15 and 16 are differing orthogonal side and end views of another version of the module shown in the FIG. 6.

DETAILED DESCRIPTION

Figure 1:
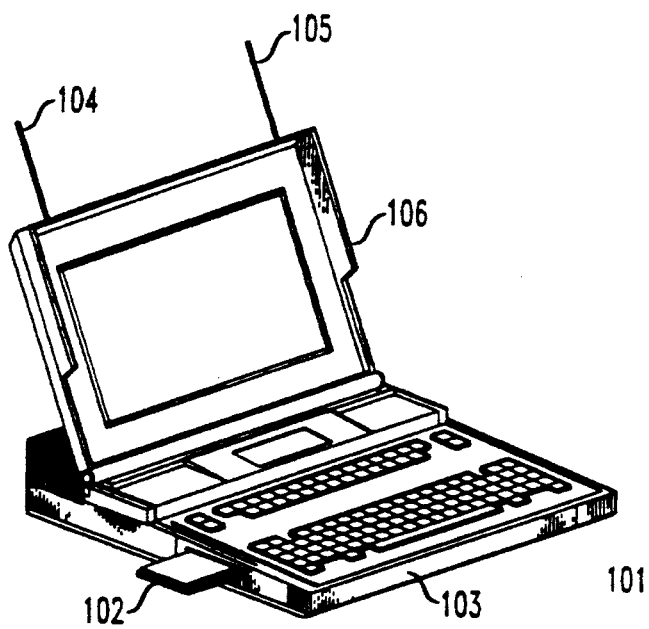
FIG. 1 is a pictorial view of a wireless enabled portable electronic apparatus.

A Wireless-enabled host apparatus is illustratively shown as a portable computer 101 in FIG. 1 The computer 101 has a plug-in module 102 inserted into its base unit 103. The plug-in module 102 is a radio transceiver connected to receive and transmit data to and from the computer. It is shown exposed for illustrative purposes. A card in use is likely to slide into the receptacle slot so that it is mostly absorbed into the base unit 103.

The computer includes one or two radio antenna 104 and 105 mounted on the top of its display monitor 106 or other suitable locations as to minimize RF (i.e. Radio Frequency) interference for the computer or PDA itself. A front end of the transceiver circuitry in the plug-in module 102 is connected by EMI-shielded cabling, internal to the computer housing, to the antennas 104 and 105. These antennas are advantageously located to function free of the EMI (i.e. Electromagnetic Interference) of the data processing circuitry and are spaced apart to allow space diversity reception.

Figure 2:
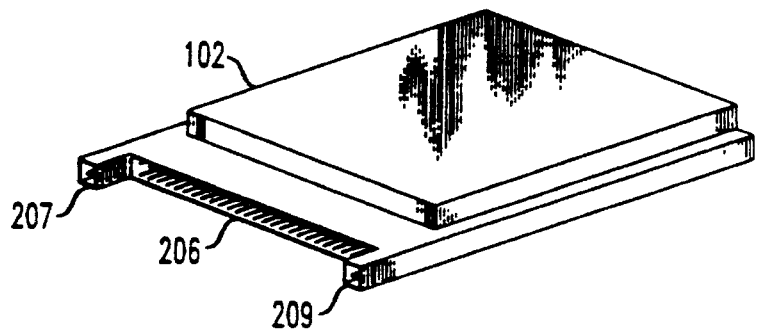
FIGS. 2 and 3 are a pictorial view of different versions of a wireless processing plug-in module.
Figure 3:
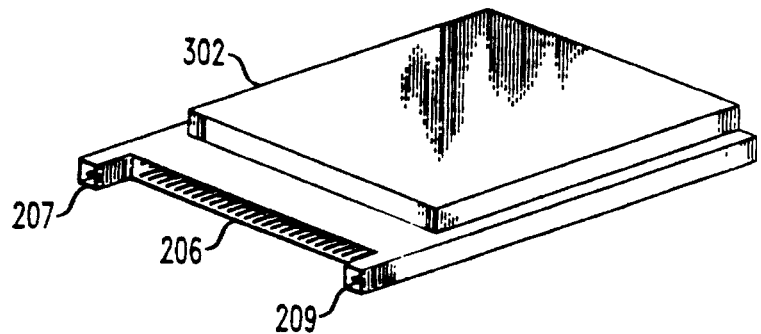

Two versions of the plug-in module are shown as modules 102 and 302 in the pictorial views of FIGS. 2 and 3. The PCMCIA compatible plug-in module 102 of FIG. 2 has a relatively thick profile to accommodate circuitry, while the version 302 shown in the FIG. 3 has a thinner profile where less circuitry, is needed. Both units 102 and 302 have the same PCMCIA standard connector profile 206 located in the central portion of the front edge of the module. RF connectors 207 and 209 are positioned on opposite sides of the PCMCIA standard connector 206.

Figure 4:
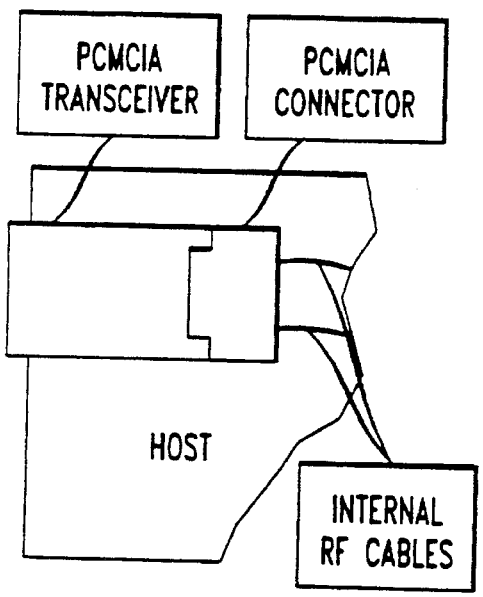
FIGS. 4 and 5 show schematic views of the plug in arrangement of a plug-in wireless processor module and another plug in unit using the same receptacle.
Figure 5:
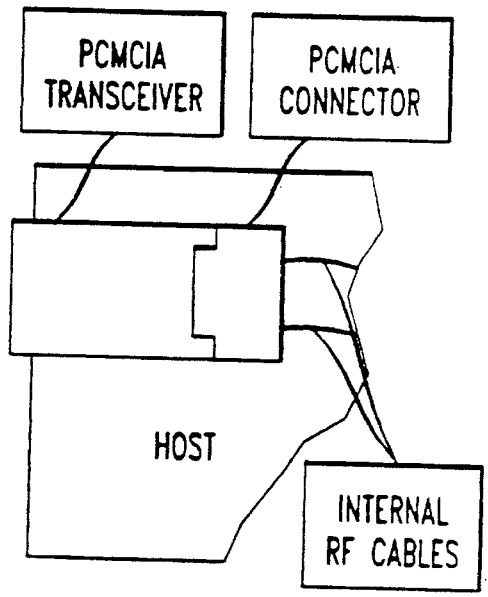

The RF connectors, as shown, protrude beyond the extent of the PCMCIA connectors to permit the PCMCIA receptacles to be used by the computer for plug-in units other than a transceiver plug-in module. The effect is shown in FIGS. 4 and 5. In FIG. 4 a transceiver plug-in is connected to the host. As shown the plane of engagement of the PCMCIA connections is displaced from the RF connectors, which are connected to the internal RF cables. The schematic of FIG. 5 discloses the use of the PCMCIA connection for other PCMCIA cards unrelated to the transceiver function.

Figure 17:
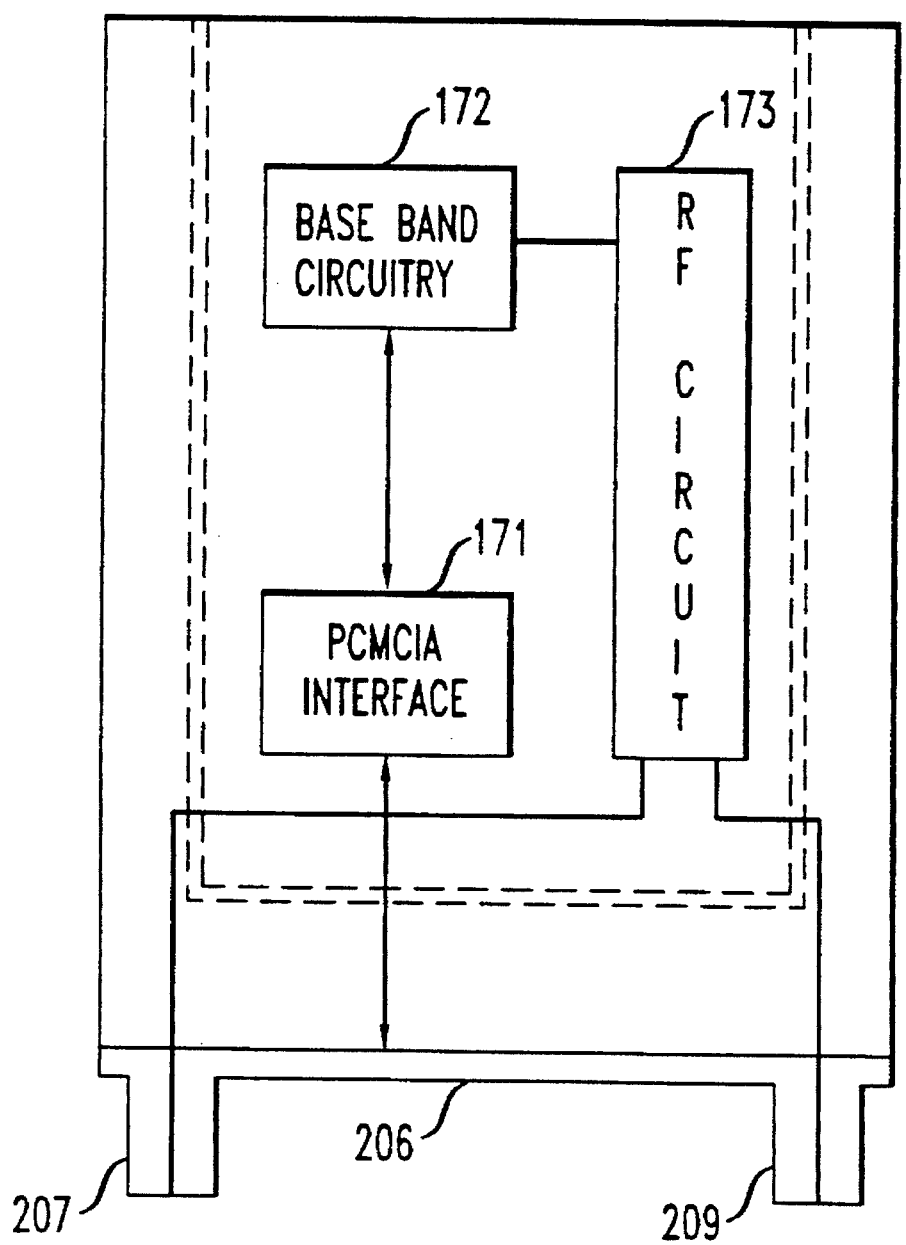
FIG. 17 is a schematic a block diagram of a radio transceiver included in the plug-in module of FIGS. 2 and 3.

A plan view of the transceiver circuitry included in the plug-in transceiver modules is shown in the FIG. 17. A profile of the plug-in transceiver is shown containing a circuit substrate 175 supporting baseband circuitry 172 which is connected through a PCMCIA interface 171 to the PCMCIA connectors 206. The baseband circuitry is connected to the RF circuit 173 which is in turn connected to the RF connectors 207 and 209.

Figure 11:
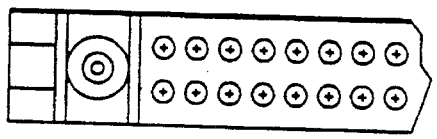
FIG. 11 is an end view orthogonal view of the connectors of the module of FIG. 6.
Figure 12:
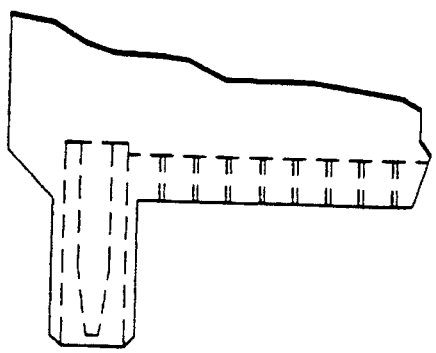
FIG. 12 is a planar view of the antenna connector of FIG. 11.

A plan view common to both versions of the plug-in module is shown in the FIG. 6. The end views of the module of FIG. 3 are shown in the FIGS. 13 and 16 and the side views are shown in the FIGS. 14 and 15. The end views of FIGS. 7 and 10 are those of the plug-in module of FIG. 2. Side views, of this module, am shown in the FIGS. 8 and 9. Details of the RF coaxial plug connector and the PCMCIA pin connectors are shown in the fragmented end view of FIG. 11 and the top view showing the displacement between the RF plug and PCMICA connector plane is shown in the FIG. 12 the mating connectors in the host are designed in conformity to the connectors of the plug-in module. The RF connector is constructed of shock resistant materials and preferably of metallic construction.

We claim:

1. A plug-in module for enabling wireless communication for a host electronic apparatus having an antenna, comprising: the host electronic apparatus having a plug-in receptacle and having a connection from the receptacle to the antenna in addition thereto; and the plug-in module having radio circuitry connectors to engage the plug-in receptacle to permit circuitry of the host to access base band circuitry of the radio circuitry and to access the antenna with terminals to access the antenna being extended beyond a range of other plug-in terminals so as to not interfere with terminals of plug in modules not intending to access the antenna.

2. A plug-in module for enabling wireless communication for a host electronic apparatus having an antenna, as claimed in claim 1;

wherein the plug-in receptacle includes data receptacles for accessing data storage and processing circuitry of the host to the baseband circuitry and separate receptacles for accessing the antenna.

3. A plug-in module for enabling wireless communication for a host electronic apparatus having an antenna, as claimed in claim 2;

wherein the separate receptacles are physically displaced from the data receptacles so that the data receptacles may be accessed to the exclusion of the separate receptacles.

4. A plug-in module for enabling wireless communication for a host electronic apparatus having an antenna, comprising:

the host electronic apparatus having a plug-in receptacle including an array of pins located in a first plane conforming to a connection standard and an additional receptacle located in a second plane displaced from the first plane and having a connection to the antenna in addition thereto; and the plug-in module, having radio circuitry, connectors to engage the array of pins to permit circuitry of the host to access baseband circuitry of the radio circuitry and an additional plug extended beyond a plane of the array of pins a distance equal to the displacement of the second plane from the second plane for connecting a front end section of the radio circuitry to the additional receptacle.

5. A plug-in module for enabling wireless communication for a host electronic apparatus having an antenna, as claimed in claim 4 wherein the plug-in module includes a second additional plug and the electronic host includes a second receptacle connected to a second antenna included in the electronic host.

6. A plug-in module for enabling wireless communication for a host electronic apparatus having an antenna, as claimed in claim 4 wherein the additional plug and additional receptacle provide a coaxial connection.

7. A plug-in module for enabling wireless communication for a host electronic apparatus having an antenna, as claimed in claim 4 wherein the array of pins and the connectors to connect to the array of pins conform to a PCMCIA standard.

8. A plug-in module for enabling radio communication of a wireless-enabled host apparatus in a wireless communication system; comprising:

the wireless-enabled host apparatus including:
      a receptacle for accepting the plug-in module; the receptacle including first connectors coupled to processing circuitry of the host and second connectors for high frequency signals; the second connectors displaced physically for allowing non conflicting use of the first connectors;
      an antenna and cable means for connecting the antenna to the second connectors of the receptacle;

the plug-in module including:
      radio circuitry having front end transmit/receive circuitry and baseband circuitry;
      baseband connectors for connecting the baseband circuitry to the first connectors and antenna connectors for connecting the front end circuitry to the second connectors, the antenna connectors displaced to allow the antenna connectors to engage the second connectors.

9. A plug-in module for enabling radio communication of a wireless-enabled host apparatus in a wireless communication system as claimed in claim 8;

wherein the first and second connectors are located in first and second planes spaced apart and the baseband and antenna connectors are spaced apart by an equal amount.

* * * * *